United States Patent [19]

Gilby

[11] Patent Number: 4,596,925

[45] Date of Patent: Jun. 24, 1986

[54] FIBER OPTIC DISPLACEMENT SENSOR WITH BUILT-IN REFERENCE

[75] Inventor: Anthony C. Gilby, Foxboro, Mass.

[73] Assignee: The Foxboro Company, Foxboro, Mass.

[21] Appl. No.: 437,091

[22] Filed: Oct. 27, 1982

[51] Int. Cl.$^4$ .................................................. H01J 5/16
[52] U.S. Cl. .................................. 250/227; 250/231 R
[58] Field of Search ............... 250/237 G, 227, 231 R; 356/395; 350/96.29

[56] References Cited

U.S. PATENT DOCUMENTS

| | | | |
|---|---|---|---|
| 4,223,216 | 9/1980 | Quick et al. ......................... | 250/227 |
| 4,275,296 | 6/1981 | Adolfsson ........................... | 250/227 |
| 4,293,188 | 10/1981 | McMahon ...................... | 250/237 G |
| 4,356,396 | 10/1982 | Ruell et al. ......................... | 250/227 |
| 4,356,448 | 10/1982 | Brogardh et al. ............... | 250/231 R |
| 4,433,238 | 2/1984 | Adolfsson et al. .................. | 250/227 |

Primary Examiner—David C. Nelms
Assistant Examiner—Stephone Allen
Attorney, Agent, or Firm—J. H. Wu; T. Martin; W. E. Meyer

[57] ABSTRACT

An apparatus usable in process control applications for detecting the position of a movable element in a sensor wherein first and second beams of light, each having different wavelengths and each preferably being alternately generated with respect to one another by a light source, are transmitted to a filter by means of an optical fiber cable connected between the light source and filter. The filter and the movable element cooperate for modulating the intensity of the first beam in accordance with the position of the movable element and thereby transforming that first beam into a measurement beam which appears at an output stage of the filter. The filter also transmits the second beam therethrough unaffected by the movable element and produces a reference beam appearing at the output stage. A first optical detector coupled to the light source the respective intensities of the two light beams being transmitted towards the filter. A second optical detector connected to the output stage of the filter measures the respective intensities of the measurement and reference beams. The four intensity measurements made by the two optical detectors are combined in a prescribed manner for producing a position signal which is representative of the position of the movable element and which is substantially independent of the transmitting factors for the optical paths transmitting the first, second, measurement and reference beams as well as substantially independent of output variations in the light source or responsivity changes in the detectors.

11 Claims, 5 Drawing Figures

FIBER OPTIC DISPLACEMENT SENSOR WITH BUILT-IN REFERENCE

BACKGROUND OF THE INVENTION

1. Field

This invention relates to displacement sensing devices for detecting the position of a movable element sensor used in process control systems and, more particularly, to an optical fiber transducer which uses two wavelengths of light for determining the position of the movable element.

2. Description of the Prior Art

A typical optical fiber displacement transducer includes an optical fiber cable connecting a light-source and light detector to a sensor. An optical signal generated by the source is transmitted through the cable to the sensor. The sensor in response to a physical variable that is desired to be measured modulates a characteristic of the optical signal in accordance with changes in the physical variable. The modulated signal is thereafter transmitted to the detector which converts that signal to a useful output representative of the magnitude of the physical variable.

Being affected by minute changes, the displacement transducer is subject to the problems of drift which usually arise because of instabilities and changes in the operation of the light-source and/or the detector. Furthermore, age may change the transmission properties of the optical cables and the couplers joining together those cables thereby introducing other sources of drift. As a result, even though transducer measurement sensitivity is high, these instabilities and changes limit the uses of these transducers to process control applications where moderate to high measurement accuracy and repeatability are not required.

These problems may be overcome to some degree by periodically recalibrating these transducers. But such recalibrations after installation will certainly add to the operational costs. Moreover, in process control applications where transmitters are installed at remote stations, periodic recalibration may not always be possible when needed because accessibility to these remote sensors is limited, such as by weather conditions.

In U.S. Pat. No. 4,249,076, issued to Bergstrom et al, an optical measuring device is disclosed wherein a portion of the modulated signal is used as a feedback control signal for insuring a constant level output from the light-source. However, this device still does not overcome the troubles that may arise from instabilities in the light detectors or in the optical cables. Furthermore, the modulated signal is divided and transmitted simultaneously through at least two optical cables to respective measurement detectors coupled to each cable. This arrangement requires that these two (or more) optical cables have matching optical properties and performances so that accurate measurements can be derived from the modulated signal produced by the sensor. The use of multiple parallel routes will increase the sources of drift that adversely affect transducer performance. Additionally, in applications requiring a sensor located at a remote station, the adverse effects of these sources of drift can increase as the lengths of the parallel routes are increased. Therefore, there is a need for improvement in fiber optic transducers, especially in those process control applications where there are moderate to high demands on accuracy and repeatability of measurements.

SUMMARY

The above-mentioned disadvantages and limitations of prior art devices for sensing the position of a movable element sensor are overcome by the provision of a new and improved apparatus made in accordance with the teachings of the present invention. In the preferred embodiment of applicant's invention, first and second beams of light produced with different wavelengths are applied to an optical fiber and transmitted to a filter located adjacently to the sensor. The filter and the movable element of the sensor cooperate with one another for modulating the intensity of the first beam in accordance with the position of the movable element and thereby transforming the first beam into a measurement beam which appears at the output stage of the filter. Being arranged to pass the second beam therethrough unaffected by the movable element, the filter also operates to transform the second beam into a reference beam which appears at the output stage of the filter. A first optical detector coupled to the optical fiber cable operates in response to the first and second beams for generating first and second output signals that are proportional to the detected intensities of the two beams being transmitted towards the filter. A second optical detector coupled to the output stage of the filter produces third and fourth output signals that are proportional to the detected intensities of the measurement and reference beams. A demodulator circuit connected to receive the four output signals produced by the two detectors operates for producing a signal representative of the position of the movable element from a prescribed combination of those four output signals.

The second beam and its resulting reference beam are used in applicant's invention to compensate for the effects that the optical paths in the transducer have on the intensities of the first beam and its resulting measurement beam. This internal reference arrangement also permits compensation for any changes (which may occur after calibration) of the transmitting properties of those optical paths so that the modulated intensity represents only that produced by the interaction between the filter and the movable element. Accordingly, the present invention overcomes the transmission path problems previously mentioned for prior art transducers.

The preferred embodiment is also arranged for generating the first and second beams as short-duration pulses of light that are applied alternatingly into the optical fiber cable. Since there is very little time for either of the light detectors to drift in sensitivity during each of the time periods (cycles) in which position measurements are made, the combination of this pulsing feature with the use of the internal reference arrangement substantially eliminates the problems discussed previously wherein instabilities adversely affect transducer measurement accuracy and repeatability.

The filter used in the preferred embodiment of the present invention has two oppositely disposed grating structures. These structures include two optically transparent substrates, one substrate being stationarily mounted and the other substrate being connected to the movable element of the sensor and arranged to slide with respect to the one substrate in accordance with changes in the position of the movable element. Formed on an opposed face of each substrate is a series of spaced grating stripes which are made of the material that is opaque to, absorptive of, or reflective to the first light beam and does not interact with the second light beam. Changes in the position of the movable element changes the relative alignment of the grating stripes of one structure with respect to the transparent spaces between the grating stripes of the other structure. Therefore, the amount of the first light beam permitted to pass through the structures can be controlled and modulated accordingly with the position of the movable element. The second light beam, being essentially unmodulated by the alignment of the stripes, passes through the structures and becomes the reference beam.

A filter used in another embodiment of the present invention includes a dichroic coating and operates not only to pass the first light beam for application to the movable element but also to reflect the second light beam away from the movable element. Being adjacent to the filter, the sensor cooperates with the filter to modulate the intensity of the first light beam in accordance with the position of a movable element and thereby produces the measurement beam. The second light beam being unaffected by the movable element is transformed by the filter into the reference beam.

The above described and other features and advantages of the present invention will be more fully understood from a reading of the ensuing description given with reference to the appended drawings.

DESCRIPTION OF THE PREFERRED EMBODIMENT

Figure 1:
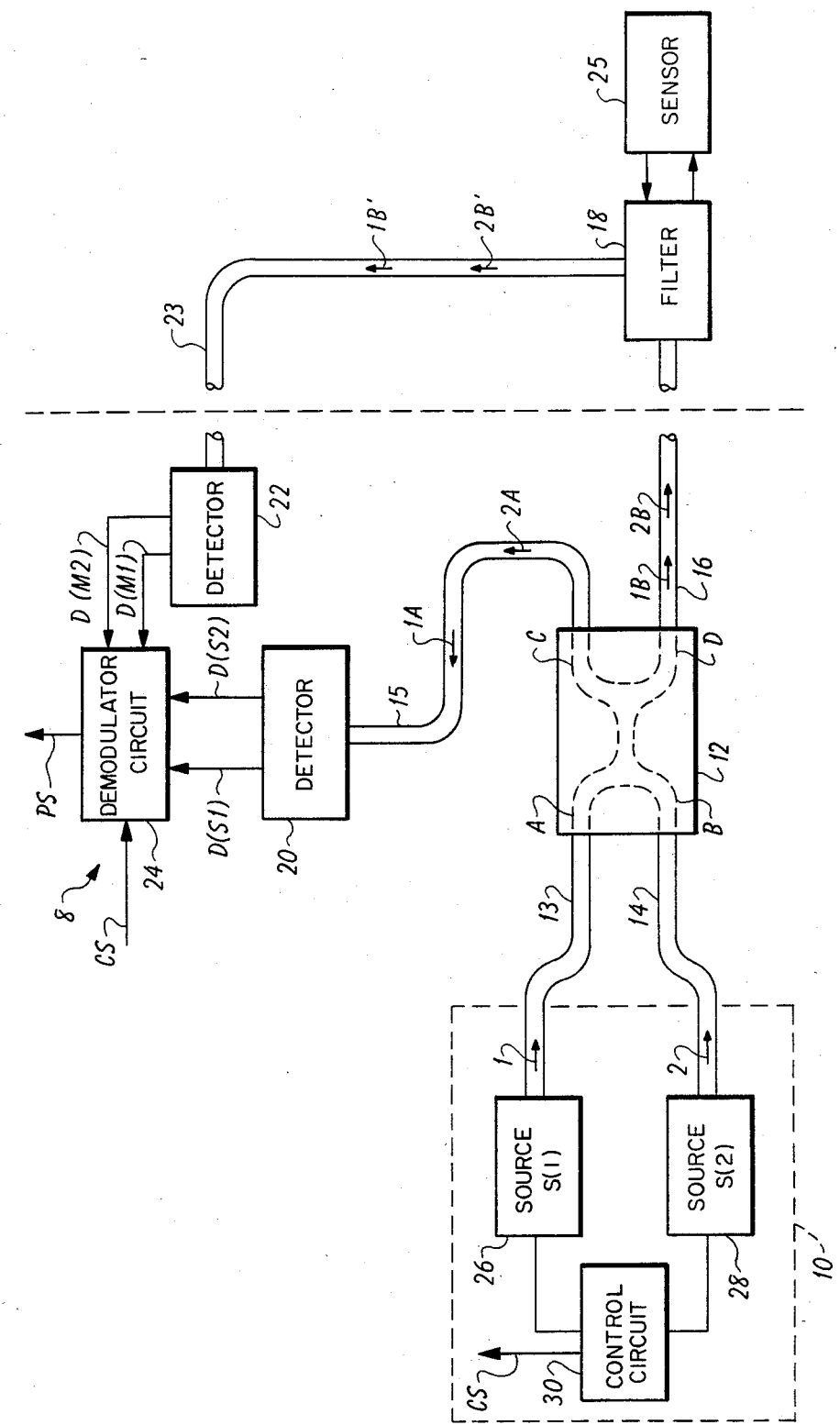
FIG. 1 is a block diagram of one embodiment of an optical-fiber, displacement-sensing device made in accordance with the teachings of the present invention.

FIG. 1 depicts in block diagram form an optical fiber transducer 8 made in accordance with the teachings of the present invention. Dual light-source 10 is connected to coupler 12 which is a conventional device for joining optical fiber cables 13 and 14 to optical fiber cables 15 and 16. Optical cable 15 connects leg C of coupler 12 to source detector 20 and optical cable 16 connects leg D to the input stage of a filter 18. The output stage of filter 18 is coupled to a measurement detector 22 by means of optical fiber cable 23. Demodulator circuit 24 is connected for receiving the four output signals generated by source detector 20 and measurement detector 22. Sensor 25 cooperates with filter 18 and is arranged to transform in conventional manner a physical variable to be measured into movement of a movable element (not shown) of the sensor. Since sensors of the type used in the present invention are well known in the process controls art, a detailed description of the design and operation of such sensors will not be presented. However, it should be understood that the position of the movable element is representative of the magnitude of the physical variable.

Light source 10 includes sources 26 and 28 which generate light beams 1 and 2 respectively. Each of these beams is produced with a predetermined wavelength different from one another but sufficiently close so that the transmittances (at each of the two wavelengths) of the optical fiber cables transmitting these beams are essentially equal. Sources 26 and 28 are controlled by control circuit 30 so that light beams 1 and 2 are preferably produced as a stream of pulses alternatingly applied to coupler 12. In other words, the production of the two beams is synchronized to permit pulses of beam 1 to be applied to coupler 12 in between the application of the pulses of beam 2. This arrangement permits source detector 20 to be constructed with a single detecting element for measuring the amplitude of each pulse appearing at the detector. The feature of a single detecting element is desirable because such arrangement avoids the problems associated with using two or more detecting elements which must be matched to one another and which can introduce additional sources of drift.

Coupler 12 is arranged so that an optical signal when applied to leg A (or leg B) will be split equally into two signals, one appearing in leg C and the other appearing simultaneously in leg D, with negligible signal appearing in leg B (or leg A). Therefore, coupler 12 operates to divide beam 1 into beams 1A and 1B and beam 2 into beams 2A and 2B. Source detector 20 upon receiving beam 1A generates signal D(S1) having an amplitude equal to the detected (measured) intensity of beam 1A. In similar manner, signal D(S2) is generated having an amplitude equal to the detected intensity of beam 2A.

Filter 18 operates to produce measurement beam 1B' by modulating (in a manner to be described) the intensity of beam 1B in accordance with the position of the movable element in the sensor. Measurement beam 1B' is transmitted via cable 23 to measurement detector 22 which generates signal D(M1) having an amplitude equal to the detected intensity of beam 1B'. Filter 18 is also arranged to pass beam 2B therethrough for producing reference beam 2B' that is unaffected by the operation of sensor 25. Measurement detector 22 coupled to receive reference beam 2B' generates signal D(M2) having an amplitude equal to the detected intensity of reference beam 2B'. Since pulses of beams 1B and 2B are alternatingly applied to filter 18, measurement beam 1B' and reference beam 2B' are alternatingly transmitted to measurement detector 22. Accordingly, detector 22 is also constructed with only one detecting element and has the same advantages as source detector 20.

Control signal CS transmitted to demodulator circuit 24 is produced by control circuit 30 with a characteristic varying between two states. One state represents the case where a pulse of light beam 1 is generated and transmitted to coupler 12. The other state represents the case where a pulse of light beam 2 is generated and transmitted to coupler 12. This arrangement permits demodulator circuit 24 to distinguish signal D(S1) from D(S2) and signal D(M1) from D(M2) so that those signals may be combined in a manner to be described.

It should be noted that filter 18 and sensor 25 are preferably remotely located from a central station where the other elements are mounted. As a result, the dotted line depicted in FIG. 1 represents the separation between the central and remote stations.

Figure 2:
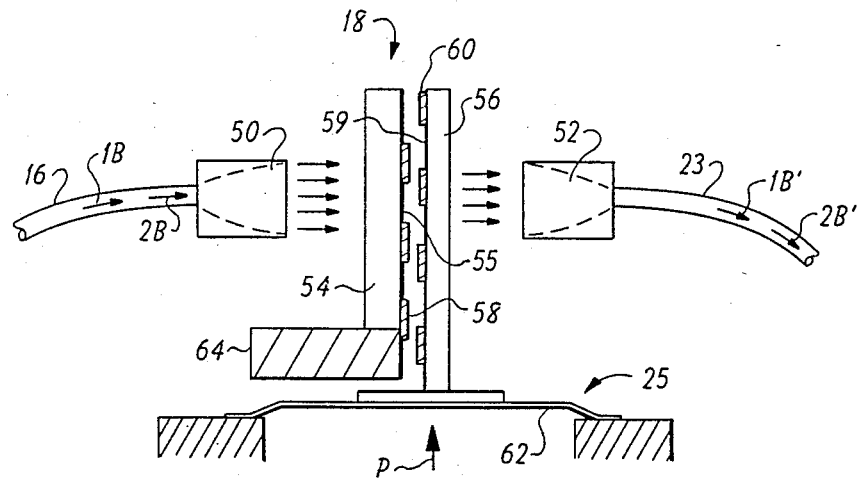
FIG. 2 is a partial sectional view of the preferred embodiment of the filter shown in FIG. 1 wherein opposed Moiré gratings are used.

With reference to FIG. 2, a partial sectional view is shown of filter 18 and sensor 25. Optical lens 50 coupled to cable 16 is a device well known in the art for expanding the relatively narrow beam received from cable 16 into a broad collimated light beam which is depicted as a series of parallel arrows. Optical lens 52 connected to cable 23 is a conventional decollimating lens which operates in reverse manner to that of lens 50 for concentrating a relatively broad beam into a narrow beam for application into cable 23. Filter 18 includes two optically transparent substrates 54 and 56 that are slideably aligned and parallel to one another. Deposited on face 55 of substrate 54 is a series of spaced horizontal stripes (bars) 58 which form a grating pattern having transparent spaces between the bars. Similarly, deposited on face 59 of substrate 56 is a matching series of horizontal stripes 60.

The grating patterns are generally known as Moiré or Ronchi gratings. Each of the grating stripes is made of a material which blocks (preferably by being opaque, absorptive or reflective) beam 1B and passes beam 2B. Substrate 58 is fixedly mounted to a stationary member 64 and substrate 56 is mounted to a movable diaphragm 62 of sensor 25. Sensor 25 in the present embodiment is a pressure sensor which responds to an applied pressure P by moving diaphragm 62 and substrate 56 attached thereto either upwards or downwards. The full range displacement of diaphragm 62 is kept less than the space between the grating stripes in order to avoid ambiguous readings.

Since the position of diaphragm 62 represents the magnitude of applied pressure P, the relative alignment of the Moiré gratings therefore represents the applied pressure. As further explanation, if the gratings are aligned such that the stripes of one grating oppose the spaces between the stripes of the other grating, essentially all of light beam 1B is blocked from being transmitted to measurement detector 22. As can be seen, other alignments will result in varying amounts of beam 1B being passed through filter 18 and thereby intensity modulated to form measurement beam 1B' for transmission to measurement detector 22. Light beam 2B passed through filter 18 without being modulated by the gratings becomes light beam 2B' which is transmitted to measurement detector 22. However, even though light beam 2B and reference beam 2B' are independent of sensor 25, they are affected by the transmitting factors (transmittances) of all the elements in transducer 8 to the same extent as light beam 1B and measurement beam 1B'. Accordingly, light beam 2B and reference beam 2B' serve as an internal reference usable for eliminating the transmission effects that the optical paths have on light beam 1B and its resulting measurement beam 1B'.

The position of diaphragm 62 is determined by transducer 8 via a predetermined combination of the signals D(S1), D(S2), D(M1) and D(M2) generated by source detector 20 and measurement detector 22. An explanation and derivation of that predetermined combination will now be presented in connection with FIGS. 1 and 2.

The four signals are described by the following-listed equations:

$$D(S1) = I(S1) \times T1 \times Tc(AC) \times T3 \quad (1)$$

$$D(S2) = I(S2) \times T2 \times Tc(BC) \times T3 \quad (2)$$

$$D(M1) = I(S1) \times T1 \times Tc(AD) \times T4 \times T(M1) \times T5 \quad (3)$$

$$D(M2) = I(S2) \times T2 \times Tc(BD) \times T4 \times T(M2) \times T5 \quad (4)$$

where:
  D(S1) and D(S2) are the intensities of light beams 1A and 2A incident on source detector 20;
  D(M1) and D(M2) are the intensities of measurement beam 1B' and reference beam 2B' incident on measurement detector 22;
  I(S1) and I(S2) are the intensities of beams 1 and 2 as generated by light-sources 26 and 28 and applied to the input of cables 13 and 14;
  T1, T2, T3, T4 and T5 are the transmittances (transmitting factors) for optical fiber cables 13, 14, 15, 16 and 23 respectively;
  Tc(AC), Tc(AD), Tc(BC) and Tc(BD) are the transmittances of coupler 12 for the optical paths denoted in the parentheses, e.g., Tc(AD) is the transmittance for the path including and connecting leg A and leg D; and
  T(M1) and T(M2) are the transmittances of filter 18 for light beams 1B and 2B respectively, T(M1) changes in accordance with the operation of sensor 25 and T(M2) is essentially constant in value.

By dividing the ratio of equations (3) and (4) by the ratio of equations (1) and (2), and removing the common terms in the resulting numerator and denominator, equation (5) is derived:

$$[D(M1) \times D(M2)]/[D(S1) \times D(S2)] = [Tc(BC) \times Tc(AD) \times T(M1)]/[Tc(AC) \times Tc(BD) \times T(M2)] \quad (5)$$

However, coupler 12 can be made so that:

$$Tc(AC)/Tc(AD) = Tc(BC)/Tc(BD) \quad (6)$$

which can be rearranged to produce:

$$[Tc(BC) \times Tc(AD)]/[Tc(AC) \times Tc(BD)] = 1 \quad (7)$$

Upon substituting equation (7) into equation (5), a simplified equation (8) is produced:

$$(D(M1)/D(M2)) \times (D(S2)/D(S1)) = T(M1)/T(M2) \quad (8)$$

The right-hand side of equation (8) lists a ratio of the two transmitting factors (transmittances) of filter 18 for light beams 1B and 2B. Since the grating stripes of filter 18 is substantially transparent to light beam 2B, transmittance T(M2) is essentially constant in value and can be determined empirically. However, transmittance T(M1) varies in value according to the position of diaphragm 62. The value of transmittance T(M1) can be calibrated such as by empirical methods to the position of diaphragm 62 representing the magnitude of pressure P. As a result, the value of the ratio on the right-hand side of equation (8) can also be calibrated to the position of diaphragm 62.

For applicant's invention, measurement of transmittance T(M1) is not required because the left-hand side of equation (8) shows a prescribed combination of the four output signals produced by detectors 20 and 22 for determining the position of diaphragm 62.

Demodulator circuit 24 (shown in FIG. 1) operates to combine those signals in accordance with the prescribed combination described by the left-hand side of equation (8). As a result, a position signal PS is generated with an amplitude which can be calibrated to the position of diaphragm 62 and therefore represents the magnitude of pressure P being measured by sensor 25.

Figure 3:
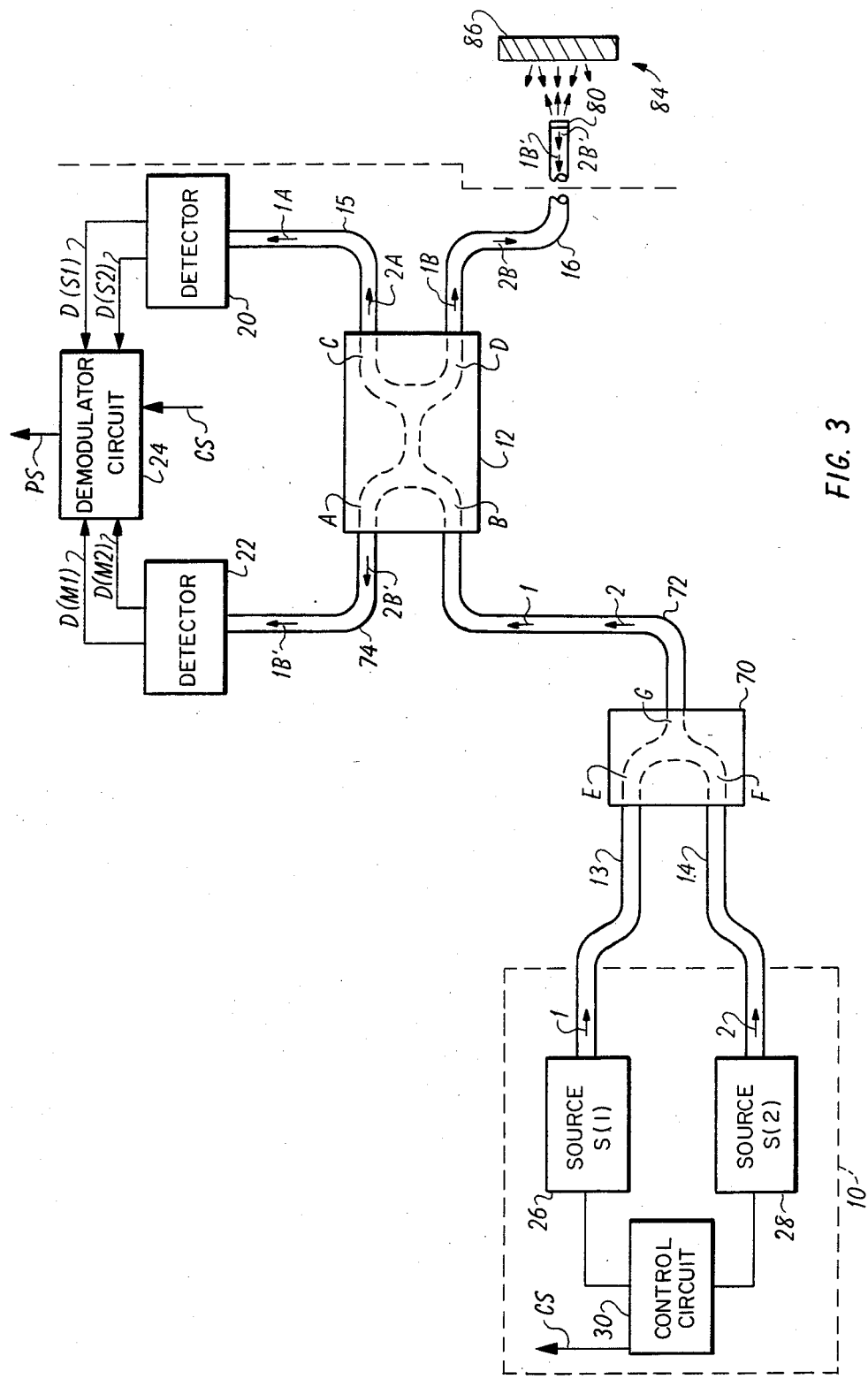
FIG. 3 is a second embodiment of the present invention wherein the filter of FIG. 1 includes a dichroic material and only one optical cable is connected between the elements located at a central station and the elements located at a remote station.

It should be understood that the prescribed combination also compensates for output variations in sources 26 and 28 as well as for responsivity changes in detectors 20 and 22. As further explanation by way of an example, if source 26 suddenly produced a pulse that is reduced 10% in intensity, the intensity of beams 1A and 1B' and the amplitudes of signals D(S1) and D(M1) would also be reduced 10%. Since the prescribed combination includes the ratio D(M1)/D(S1), it can be seen that the percentage reduction in amplitudes of those two signals cancel one another. Similarly, if either or both detectors 20 and 22 were to drift, the resulting changes in the signals produced by each of those detectors would cancel one another because the prescribed combination includes the ratios D(M1)/D(M2) and D(S2)/D(S1). FIG. 3 depicts a second embodiment of the present invention wherein a central station includes light-source 10, optical couplers 12 and 70, source detector 20, measurement detector 22, demodulator circuit 24, one portion of cable 16 and cables 13, 14, 15, 72 and 74. Coupler 70 is a conventional device for joining cables 13 and 14 to optical fiber cable 72. An optical signal applied to leg E (or leg F) will be transmitted to leg G with negligible signal appearing in leg F (or leg E). Located in a remote station are filter 80, a second portion of cable 16 and sensor 84 having movable element 86. Filter 80 mounted at the end of cable 16 to be adjacent sensor 84 includes a dichroic coating made of a material which passes beam 1B for application to element 86. Element 86 having a reflective surface thereon returns a portion of beam 1B through filter 80 as measurement beam 1B' for transmission through cable 16. Since the distance between element 86 and filter 80 affects the amount of light which will be returned through filter 80 as measurement beam 1B', the intensity of measurement beam 1B' is therefore modulated by the position of element 86.

The dichroic material is also selected to have the property of reflecting light beam 2B directly into cable 16 without that beam being affected by sensor 84. Reference beam 2B' is thereby formed and transmitted via cable 16 to coupler 12. As previously described in FIG. 1, source detector 20 measures the respective intensities of light beams 1B and 2B by measuring light beams 1A and 2A and measurement detector 22 measures the intensities of measurement beam 1B' and reference beam 2B'. The four intensity measurements are then combined by demodulator circuit 24 which produces position signal PS. It should be pointed out that this second embodiment includes only one optical cable 16 for carrying signals between the central and remote stations, whereas the embodiment depicted in FIG. 1 requires two optical cables 16 and 23. This second arrangement therefore conserves the number of optical cables between the stations and is useful for applications having multiple transducers to reduce the number of optical cables.

Figure 4:
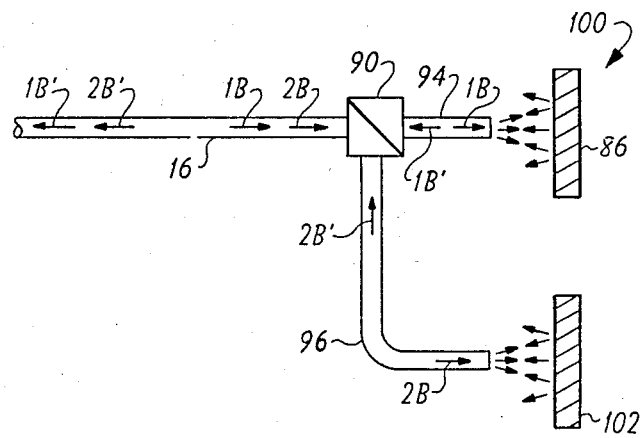
FIG. 4 is a third embodiment of the present invention which uses a stationary reference surface.

FIG. 4 shows an alternative configuration for the filter used in the present invention. Filter 90 is arranged as a conventional beam splitter and includes a dichroic coating therein made of a material which passes light beam 1B into optical cable 94 and diverts light beam 2B into optical cable 96. After light beam 1B is applied to the reflective surface of movable element 86, a portion of that beam is returned through cable 94 and filter 90 to cable 16 as measurement beam 1B'. It should be recalled that the position of movable element 86 determines the intensity of measurement beam 1B' that is applied to cable 16. After light beam 2B is applied to a reflective surface on stationary reference element 102, a portion of that beam is returned through cable 96 and filter 90 to cable 16 as reference beam 2B'.

The above arrangement permits both light beams 1B and 2B to be applied to correspondingly associated reflective surfaces so that measurement beam 1B' and reference beam 2B' are produced with substantially equal numerical apertures. This application is particularly useful, for example, in the case where cable 16 has many bends. As further explanation, if the difference between the numerical apertures of the two beams being applied into the cable is substantial, the many bends in cable 16 are likely to affect each beam differently. This result is undesirable because the present invention is based on the condition that the optical paths affect both measurement and reference beams similarly. Thus, the configuration depicted in FIG. 4 substantially eliminates any adverse effects that may arise if cable 16 had to be installed with many bends.

It should be noticed that the transducers depicted in FIGS. 3 and 4 both have one optical cable between the remote and central stations. If that cable was lengthy and actually installed with many connectors, the accuracy of the transducer will be degraded because those connectors introduce transmission path discontinuities which produce unwanted back reflections intermediate the remote and central stations. These undesirable reflections produce stray light at measurement detector 22 which is not related to the position of the sensor and therefore results in measurement errors.

Figure 5:
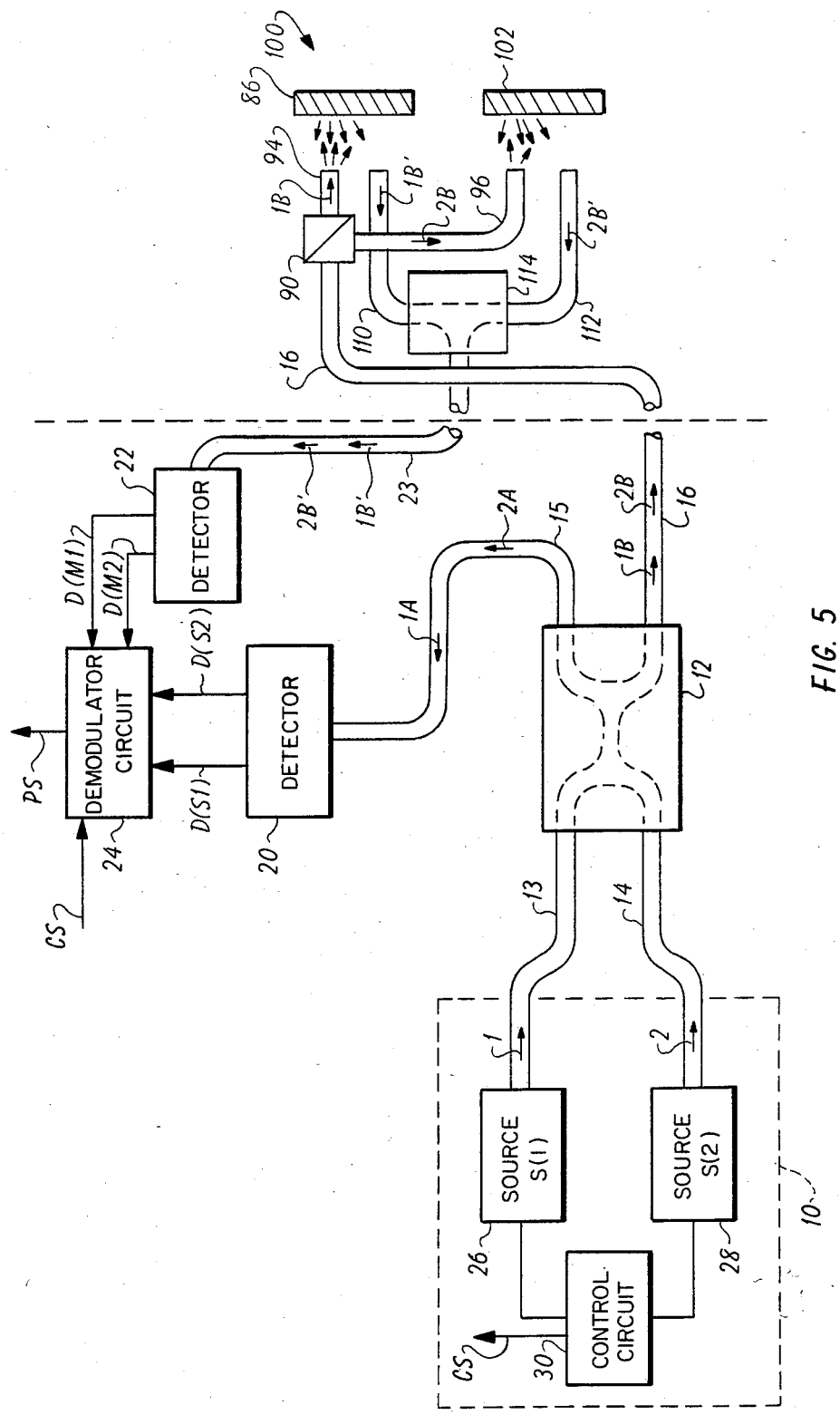
FIG. 5 is a fourth embodiment of the present invention having a filter which includes four individual optical paths for carrying light beams between the filter and sensor that are shown in FIG. 1.

FIG. 5 depicts another embodiment of the present invention which eliminates the problems associated with the above-mentioned back reflections. In this embodiment, cable 16 transmits light beams 1B and 2B, cable 23 transmits measurement beam 1B' and reference beam 2B', optical fiber cable 110 receives measurement beam 1B' produced by the interaction between light beam 1B with movable element 86 of sensor 100, and optical fiber cable 112 receives reference beam 2B' produced by the interaction between light beam 2B with stationary reference element 102. Optical coupler 114 is a conventional device for connecting cables 110 and 112 to cable 23. Since the arrangement shown in FIG. 5 includes separate optical paths for transmitting beams in each direction, the back reflections do not interfere with the measurement operation of the transducer. Finally, even though the quantitative equations, corresponding to equations (1) through (4), describing the operation of each of the embodiments shown in FIGS. 3 through 5 all involve added factors, such as the reflectivities of filter 90 and the movable surfaces in sensors 84 and 100, it can be shown that the measured position of movable element 86 is still determined from the prescribed combination shown on the left-hand side of equation (8). Therefore, source detector 20, measurement detector 22 and demodulator circuit 24 that are used in the configurations depicted in FIGS. 1 and 2 are also used for the other embodiments of applicant's invention shown in FIGS. 3 through 5.

While the present invention has been described with reference to several embodiments, it will be apparent that improvements and modifications made within the purview of the invention without departing from the true spirit and scope thereof as defined in the apended claims.

I claim:

1. An apparatus, usable for detecting the static position of a movable element in a sensor, comprising:

optical transmission fiber means having one end adjacent said movable element;

light-source means coupled to said fiber means at a location away from said one end, said source means being operative for applying into said fiber means first and second light beams which have prescribed first and second wavelengths respectively and which are transmitted through said fiber means towards said movable element said light source means operating for producing the first and second light beams as pulses of light which are each applied alternatingly into said fiber means so that each pulse of one light beam is carried in said fiber means between the pulses of the other beam;

a single first detector means connected to said light-source means for measuring the intensity of each respective pulse of said first and second light beams and for generating first and second output signals that are proportional to the corresponding intensities of said first and second light beams;

modulating means coupled to said fiber means for modulating the intensity of said first light beam in accordance with the position of said movable element so as to produce a measurement beam, said modulating means arranged for transmitting therethrough said second light beam substantially unaffected by said movable element along a path substantially the same as that traveled by said first light beam and said measurement beam so as to produce a reference beam;

a single second detector means connected for receiving both said measurement and reference beams and operative for measuring the intensity of each respective pulse of said first and second light beams and for producing third and fourth output signals that are proportional to the corresponding intensities of said measurement and reference beams;

wherein said first through fourth output signals are usable when combined in accordance with known physical principles for obtaining a measure of the position of said movable element.

2. The apparatus of claim 1 wherein said light-source means in said first and second detector means are disposed at a first station and said filter means and sensor are disposed at a second station remotely located at a distance from said first station.

3. The apparatus of claim 2 wherein said second detector means is connected to said fiber means and one path in said fiber means is used for transmitting said first and second light beams towards said movable element as well as for transmitting said measurement and reference beams to said second detector means.

4. The apparatus of claim 2 wherein said fiber means includes a first path for transmitting said first and second light beam towards said movable element and a second path for transmitting said measurement and reference beams to said second detector means.

5. The apparatus of claim 1 wherein said modulating means comprises:

stationary support means;

grating means including two optically-transparent planar substrates that are slidably opposed to one another, wherein one substrate is mounted to said support means and the other substrate is coupled to said movable element; and first and second mutually aligned gratings formed respectively on said two substrates, wherein each of said gratings includes spaced bars each made of a material that blocks said first light beam and transmits said second light beam;

wherein said apparatus is arranged such that changes in the position of said movable element changes the relative alignment of the spaced bars of said first and second gratings and thereby modulates the intensity of said first light beam and said modulating means passes said second light beam therethrough substantially unaffected by the position of said movable element.

6. The apparatus of claim 5 wherein said light-source means in said first and second detector means are disposed at a first station and said sensor and said modulating means are disposed at a second station remotely located at a distance from said first station.

7. The apparatus of claim 1 wherein said modulating means includes a dichroic material which permits said first light beam to pass therethrough for subsequent modulation by said movable element and which reflects said second light beam away from said movable element.

8. The apparatus of claim 7 wherein said sensor further includes a reference element which is operable with said modulating means for modulating said second light beam so as to produce said reference beam with a numerical aperture substantially equal to that for said measurement beam.

9. The apparatus of claim 8 wherein said light-source means in said first and second detector means are disposed at a first station and said sensor and said modulating means are disposed at a second station remotely located at a distance from said first station.

10. The apparatus of claim 8 wherein said fiber means includes a first path for transmitting said first and second light beam towards said movable element and a second path for transmitting said measurement and reference beams to said second detector means.

11. The apparatus of claim 7 wherein said light-source means in said first and second detector means are disposed at a first station and said sensor and said modulating means are disposed at a second station remotely located at a distance from said first station.